US 8,205,250 B2

(12) United States Patent
Blaikie et al.

(10) Patent No.: US 8,205,250 B2
(45) Date of Patent: Jun. 19, 2012

(54) METHOD OF VALIDATING A DIGITAL CERTIFICATE AND A SYSTEM THEREFOR

(75) Inventors: Andrew R. Blaikie, Waterloo (CA); Gene R. Franklin, Waterloo (CA); Peter J. Hendsbee, Waterloo (CA); Jane A. S. Hunter, Burlington (CA); Jeewhoon Park, Mississauga (CA)

(73) Assignee: NCR Corporation, Duluth, GA (US)

( * ) Notice: Subject to any disclaimer, the term of this patent is extended or adjusted under 35 U.S.C. 154(b) by 1284 days.

(21) Appl. No.: 11/827,865

(22) Filed: Jul. 13, 2007

(65) Prior Publication Data

US 2009/0019280 A1 Jan. 15, 2009

(51) Int. Cl.
*G06F 7/04* (2006.01)
(52) U.S. Cl. ....... 726/10; 726/1; 726/2; 726/5; 709/225; 713/155; 713/156; 713/157; 713/158; 713/159; 713/176; 713/186; 711/147; 711/148; 711/149; 711/150; 711/151; 711/152; 711/153; 380/247; 380/248; 380/249; 380/250
(58) Field of Classification Search .................. 713/176, 713/180, 155–159, 186; 726/1, 2, 5, 10; 709/225; 711/147–153; 380/247–250
See application file for complete search history.

(56) References Cited

U.S. PATENT DOCUMENTS

| 2003/0237004 A1* | 12/2003 | Okamura | 713/201 |
| 2005/0228999 A1* | 10/2005 | Jerdonek et al. | 713/176 |

\* cited by examiner

*Primary Examiner* — Edan Orgad
*Assistant Examiner* — Roderick Tolentino
(74) *Attorney, Agent, or Firm* — Michael Chan

(57) ABSTRACT

A method of validating a digital certificate comprises retrieving from a first data store a digital certificate, retrieving from a second data store a plurality of certificate revocation lists (CRLs), and selecting one of the plurality of CRLs to validate the digital certificate as of a date which is before the current date.

11 Claims, 6 Drawing Sheets

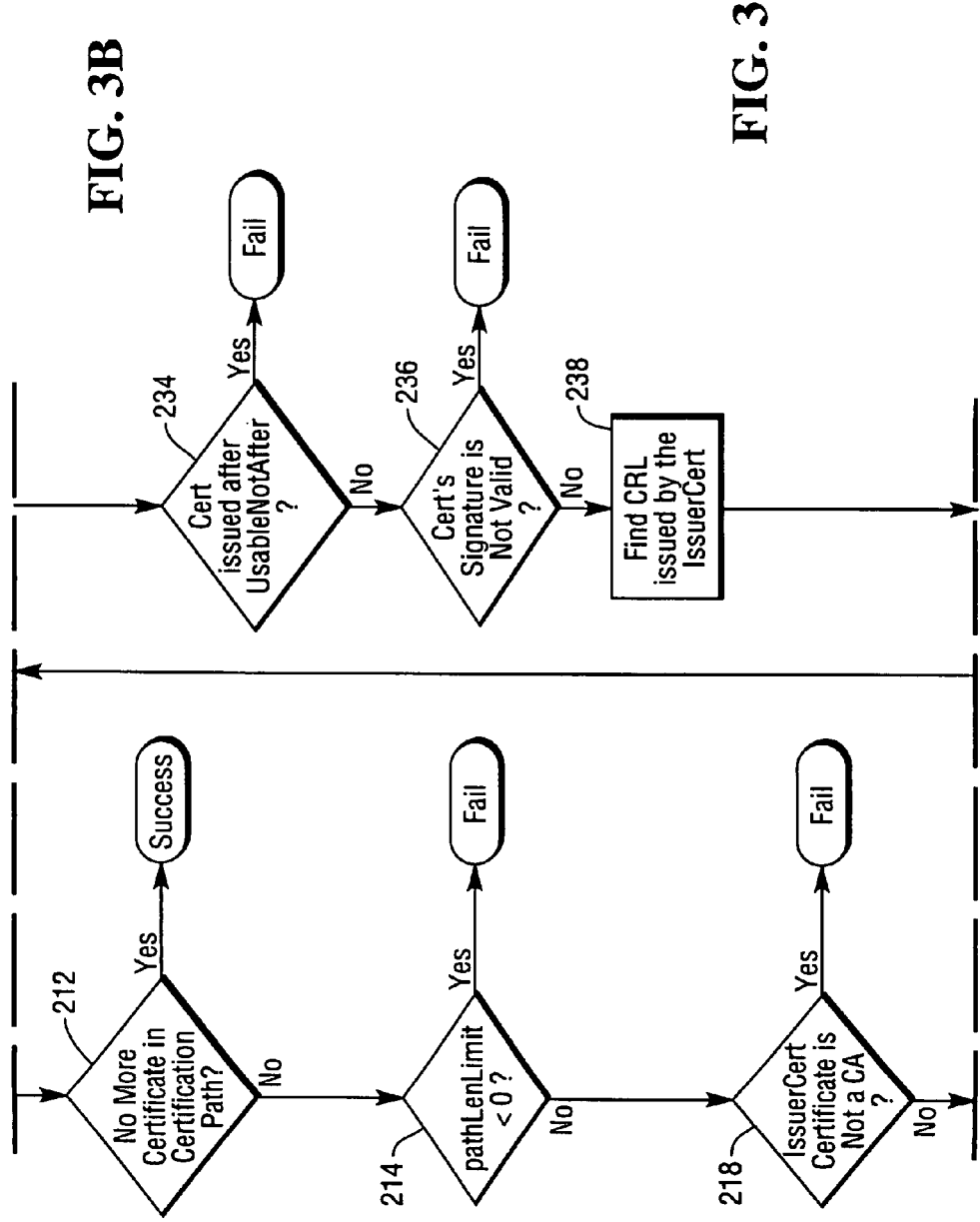

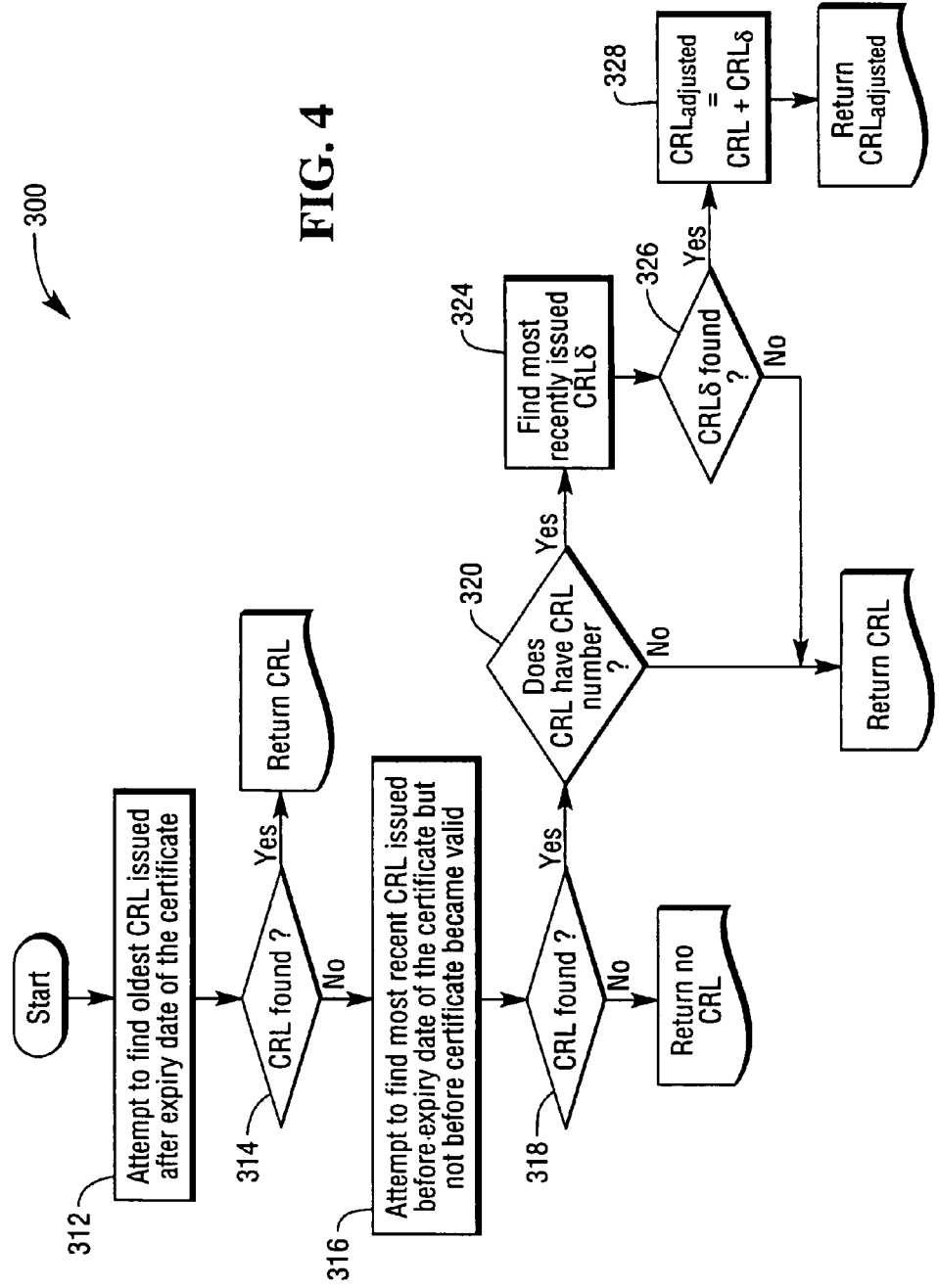

METHOD OF VALIDATING A DIGITAL CERTIFICATE AND A SYSTEM THEREFOR

BACKGROUND

The present invention relates to digital certificates, and is particularly directed to a method of validating a digital certificate and a system therefor.

In known methods of validating a digital certificate, the digital certificate is validated as of the current date, and not a historical date (i.e., a date in the past). While the subject of validating a digital certificate as of a date in the past has been publicly discussed, Applicant is not aware of a system or method which is in operation today for validating a digital certificate as of a historical date. Depending upon the particular application in which the digital certificate is being validated, it would be desirable to be able to validate a digital certificate as of a historical date.

SUMMARY

In accordance with one embodiment of the present invention, a method is provided of validating a digital certificate. The method comprises retrieving from a first data store a digital certificate, retrieving from a second data store a plurality of certificate revocation lists (CRLs), and selecting one of the plurality of CRLs to validate the digital certificate as of a date which is before the current date.

BRIEF DESCRIPTION OF THE DRAWINGS

In the accompanying drawings:

FIG. 4 is a flowchart depicting operation of a certificate revocation list (CRL) locating sub-program for use in the program of FIG. 3.

DETAILED DESCRIPTION

Figure 1:
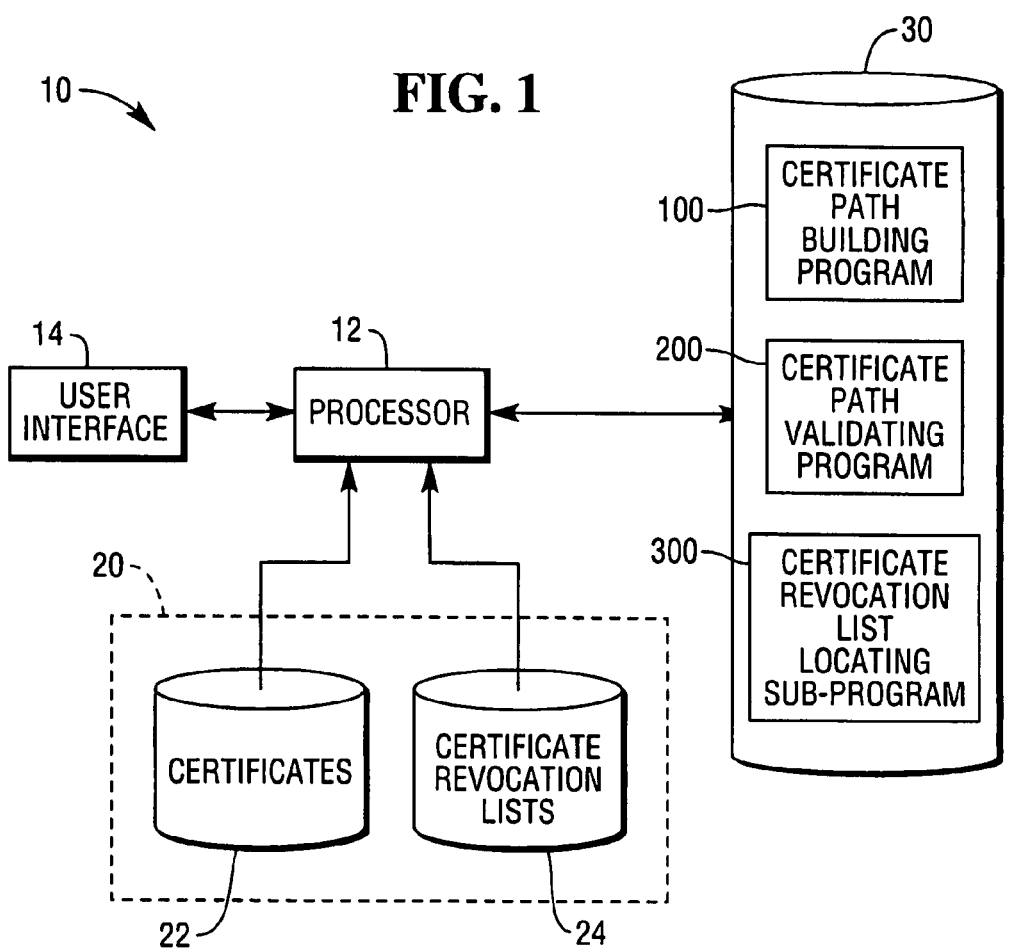
FIG. 1 is a schematic block diagram of a digital certificate validation system embodying the present invention.

The present invention relates to digital certificates, and is particularly directed to a method of validating a digital certificate and a system therefor. A digital certificate validation system 10 is illustrated in FIG. 1. The system 10 comprises a processor 12 which communicates with a user interface 14, accesses data from a database 20, and executes application programs stored in a program store 30. The user interface 14 includes typical input and output devices which allow a human operator to make a request to validate a digital certificate.

The database 20 includes a first data store 22 which stores digital certificates. The digital certificate preferably meets the Internet X.509 PKI ("public key infrastructure") profile which is known. Such a digital certificate has required field attributes. Required field attributes include Version, Serial Number, Signature, Issuer, Validity, Subject, Subject Public Key Info, AKI Key Identifier, SKI, Basic Constraints, and Key Usage. Each certificate is uniquely identifiable by the combination of the field attribute values of Issuer and Serial Number.

The database 20 further includes a second data store 24 which stores certificate revocation lists (CRLs). A CRL is issued by a certificate authority (CA). A CRL contains information about digital certificates which have been placed on hold. A CRL also contains information about digital certificates which have been revoked. CRLs and the information contained therein are known and, therefore, will not be described. The CRLs also preferably meet the Internet X.509 PKI profile. Such a CRL has required field attributes. Required field attributes include Version, Signature, Issuer, This Update, and Next Update. Each CRL is uniquely identifiable by the combination of either the field attribute values of Issuer and This Update or the field attribute values of Issuer and CRL Number.

The program store 30 contains a number of application programs. More specifically, the program store 30 contains a certification path building program 100 and a certification path validating program 200. Each of the programs 100, 200 will be described in detail hereinbelow. The program store 30 also contains a CRL locating sub-program 300 for use in the certification path validating program 200 of FIG. 3.

When a human operator desires to validate a digital certificate as of a historical date (i.e., a date in the past), the operator interacts via the user interface 14 to make a request to validate the digital certificate. In response to the request, the processor 12 invokes the programs 100, 200, 300 as described hereinbelow to validate the digital certificate.

Figure 2:
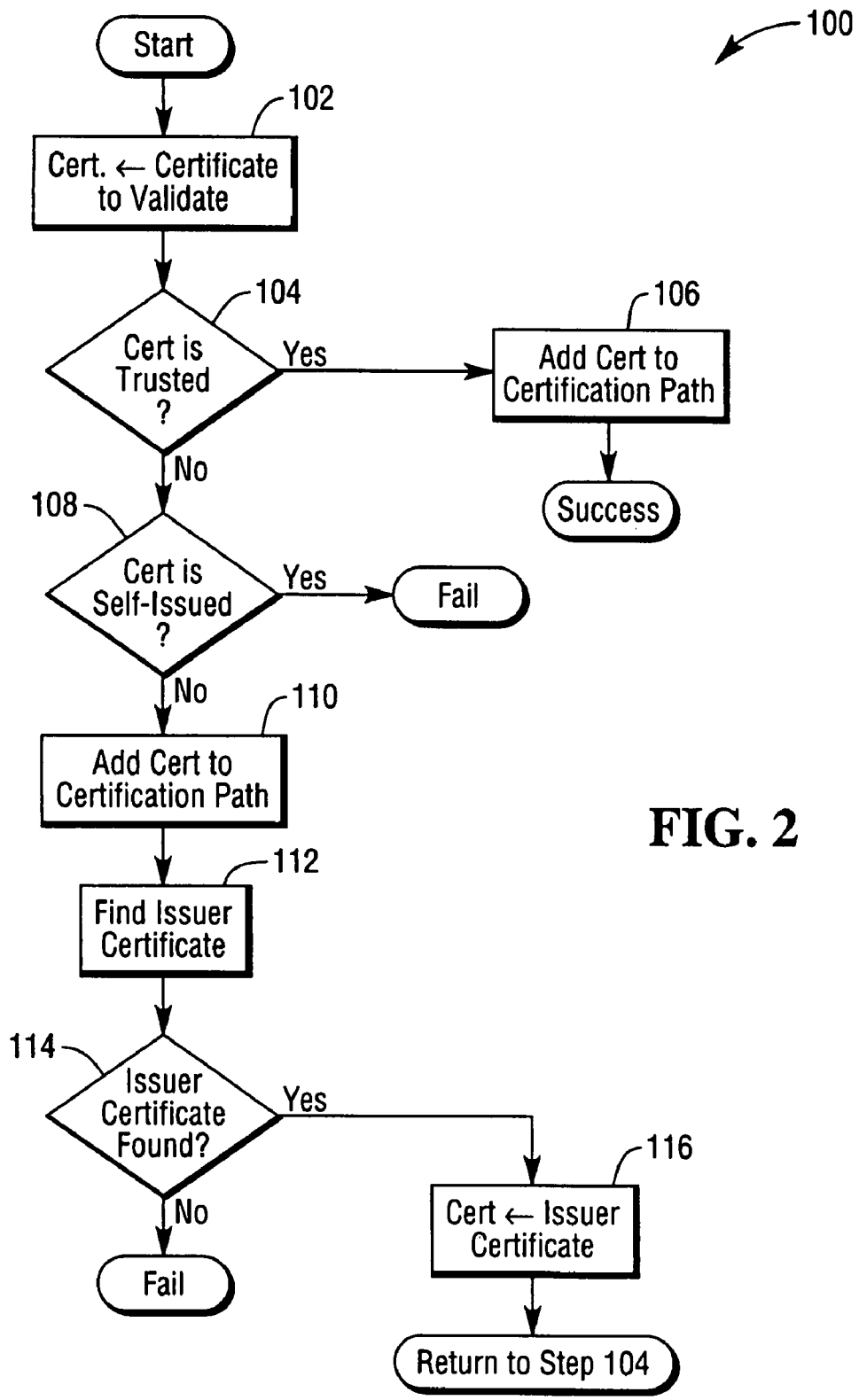
FIG. 2 is a flowchart depicting operation of a certification path building program which is used in the system of FIG. 1.

Referring to FIG. 2, a flowchart 100 depicts operation of the certification path building program 100 which is executed by the processor 12 in response to the operator making a request to validate a digital certificate. In step 102, a variable "Cert" is set equal to the certificate being requested to be validated. A determination is made in step 104 as to whether Cert is from a trusted source. If the determination in step 104 is affirmative (i.e., the certificate being validated is from a trusted source), then Cert is added to a certification path (step 106). The building of a certification path is thereby deemed to be successful, and the program returns a certification path.

However, if the determination in step 104 is negative (i.e., the certificate being validated is not from a trusted source), the program proceeds to step 108 in which a determination is made as to whether Cert is self-issued. If the determination in step 108 is affirmative (i.e., Cert is self-issued), then the operator is alerted with either a list of warnings or an error indication depending upon whether the program is configured to provide the list of warnings or the error indication. However, if the determination in step 108 is negative (i.e., Cert is not self-issued), then Cert is added to a certification path (step 110) to build the certification path.

The program then proceeds to step 112 in which an attempt is made to find an issuer certificate in the first data store 22 based upon information contained in Cert (i.e., the certificate being validated). A determination is then made in step 114 as to whether an issuer certificate is found. If the determination in step 114 is negative (i.e., no issuer certificate has been found), then the operator is alerted with either a list of warnings or an error indication. However, if the determination in step is affirmative (i.e., an issuer certificate has been found), then the program proceeds to step 116 in which the variable Cert is set equal to the issuer certificate which was found back in step 112. The program then returns back to step 104 to repeat the above-described steps for Cert which is now set equal to the issuer certificate found back in step 112.

From the program 100 described hereinabove, it should be apparent that either a certification path is returned (i.e., a certification path has been built) or the operator is alerted with a list of warnings or an error indication. It should also be apparent that the certification path just built is like a stack where the certificate being validated is at the bottom of the stack. Any additional certificate is then added to the top of the stack. When a certification path is returned, the top item is always a trusted certificate. After a certification path is returned from the certification path building program 100 of FIG. 1, the processor 12 proceeds to execute the certification path validating program 200 shown in FIG. 3.

Figure 3A:
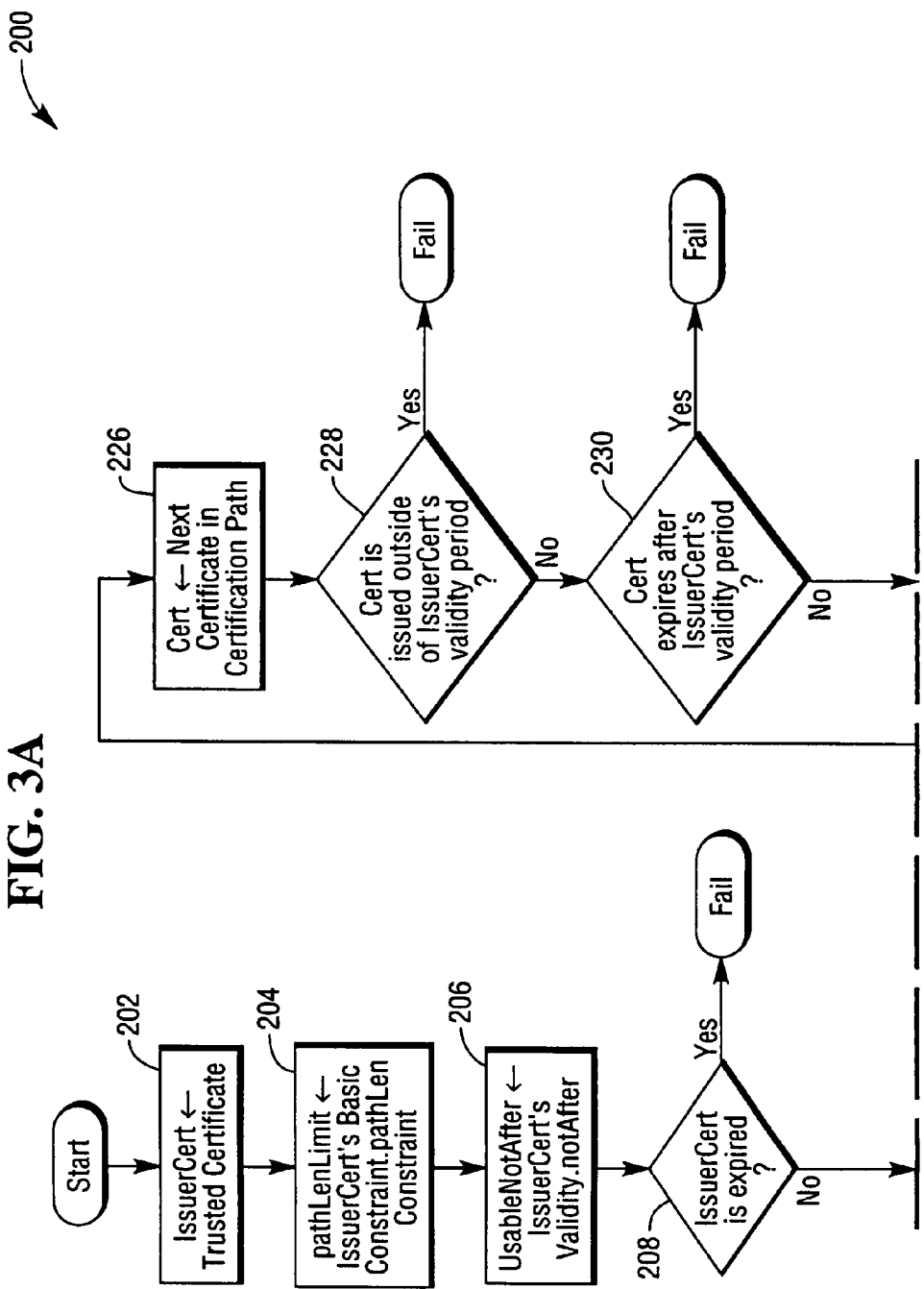
FIG. 3 is a flowchart depicting operation of a certification path validating program which is used in the system of FIG. 1.
Figure 3C:
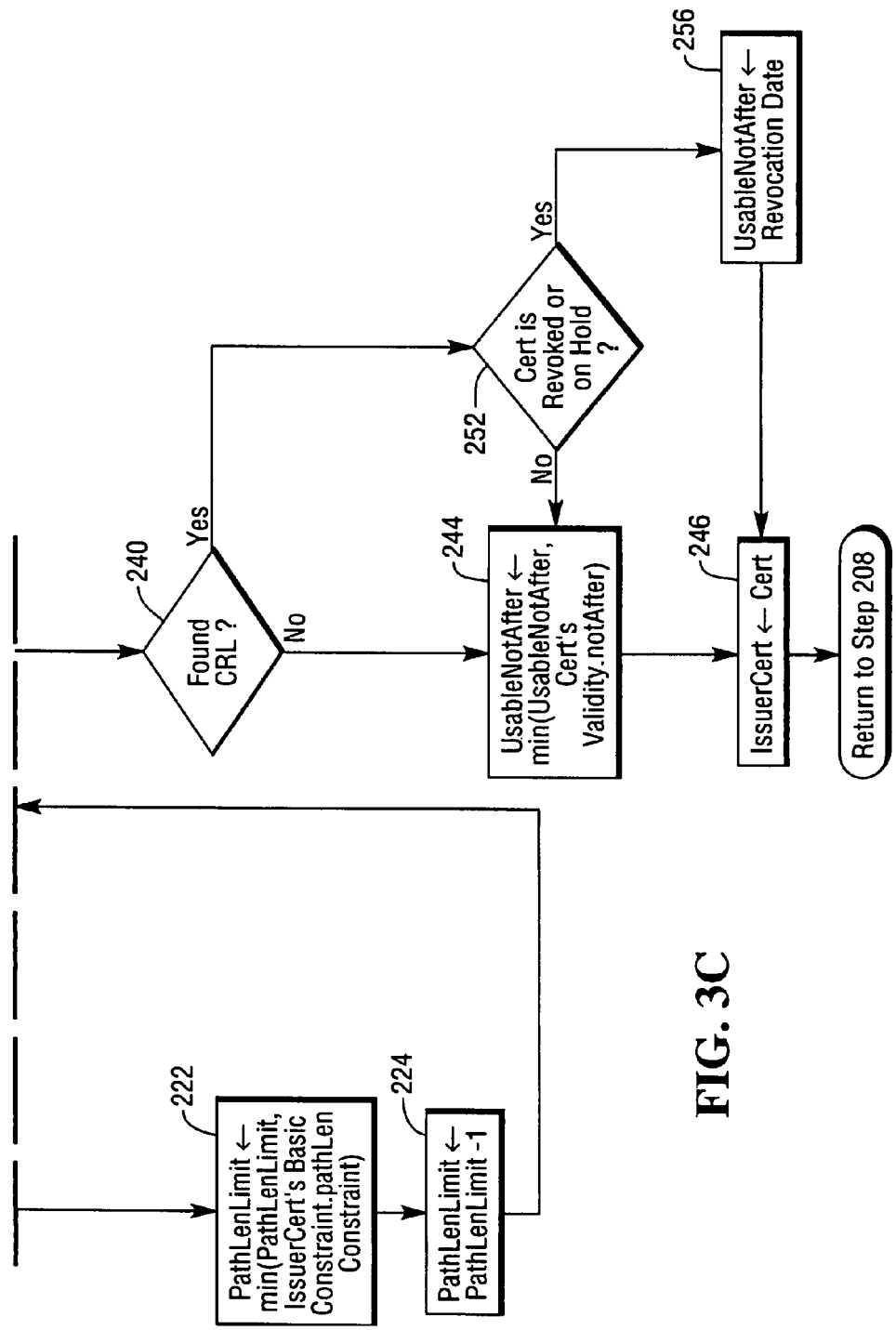

Referring to FIG. 3, a flowchart 200 depicts operation of the certification path validating program 200. In step 202, a variable "IssuerCert" is set equal to the top item of the stack (i.e., the certification path which was built from the certification path building program 100). As mentioned, the top item of the certification path is always a trusted certificate. Also, in step 204, a variable "pathLenLimit" is initialized with the field attribute value of "BasicConstraint.pathLenConstraint" from the trusted certificate. If this field attribute value of the certificate is not defined, then the value of the variable pathLenLimit is set equal to infinity. Further, in step 206, a variable "UsableNotAfter" is initialized with the field attribute value of "Validity.notAfter" from the certificate.

The program then proceeds to step 208 to determine if IssuerCert has expired by determining if the field attribute value of "Validity.notAfter" from the trusted certificate is before a value which is representative of the current time. If the determination in step 208 is affirmative (i.e., the certificate has expired), then the operator is alerted with an error indication. However, if the determination in step 208 is negative (i.e., the certificate has not expired), then the program proceeds to step 212.

In step 212, a determination is made as to whether there are no more certificates in the certification path. If the determination is affirmative (i.e., there are no more certificates in the certification path), then the present certificate being validated is deemed to be successfully validated and the value of the variable "UsableNotAfter" is provided to the operator. The value of the variable "UsableNotAfter" is representative of the time after which the certificate is no longer valid. However, if the determination in step 212 is negative (i.e., there is another certificate in the certification path), then the program proceeds to step 214 in which a determination is made as to whether the value of the variable "pathLenLimit" is less than zero. If the determination in step 214 is affirmative (i.e., the value of the variable "pathLenLimit" is less than zero), then the operator is alerted with an error indication. However, if the determination in step 214 is negative (i.e., the value of the variable "pathLenLimit" is not less than zero), then the program proceeds to step 218.

In step 218, a determination is made as to whether the certificate IssuerCert is not a CA. If the determination in step 218 is affirmative (i.e., the certificate IssuerCert is not a CA), then the operator is alerted with an error indication. However, if the determination in step 218 is negative (i.e., the certificate IssuerCert is a CA), then the program proceeds to step 222. In step 222, the value of the variable "pathLenLimit" is set equal to the lesser value of the current value of "pathLenLimit" and IssueCert's field attribute value of "BasicConstraint.pathLenConstraint". Then, in step 224, the value of the variable "pathLenLimit" is decremented by one. The program proceeds to step 226 in which the variable "Cert" is set equal to the next certificate in the certification path.

A determination is then made in step 228 as to whether Cert issued on a date outside of IssueCert's field attribute value which is representative of a validity period. If the determination in step 228 is affirmative (i.e., the certificate Cert issued on a date outside of the validity period), then the operator is alerted with an error indication. However, if the determination in step 228 is negative (i.e., the certificate issued on a date within the validity period), then the program proceeds to step 230 in which a determination is made as to whether Cert expires after IssueCert's field attribute value which is representative of the validity period. If the determination in step 230 is affirmative (i.e., Cert expires after the validity period), then the operator is alerted with an error indication. However, if the determination in step 230 is negative (i.e., Cert expires after the validity period), then the program proceeds to step 234.

In step 234, a determination is made as to whether Cert issued after the date which is represented by the value of the variable "UsableNotAfter" which was set equal to IssuerCert's field attribute value of "Validity.notAfter" back in step 206. If the determination in step 234 is affirmative (i.e., Cert issued after the date which is represented by the field attribute value of "Valid.notAfter"), then the operator is alerted with an error indication. However, if the determination in step 234 is negative (i.e., Cert did not issue after the date which is represented by the field attribute value of "Valid.notAfter"), then the program proceeds to step 236 to make a determination as to whether Cert's signature is not valid. If the determination in step 236 is affirmative (i.e., Cert's signature is not valid), then the operator is alerted with an error indication. However, if the determination in step 236 is negative (i.e., Cert's signature is valid), the program proceeds to step 238.

In step 238, an attempt is made to locate a CRL issued by IssuerCert. The program then proceeds to step 240 in which a determination is made as to whether an issued CRL was found in step 238. If the determination in step 240 is negative (i.e., no CRL has been found), then the program proceeds to steps 244 and 246. In step 244, the value of the variable "UsableNotAfter" is set to the lesser value of the current value of "UsableNotAfter" and Cert's field attribute value of "Validity.notAfter". And then in step 246, the variable IssuerCert is now set to be equal to Cert to obtain the next certificate in the certification path (i.e., the next certificate in the stack is popped off the stack). The program returns back to step 208 to repeat the steps for this new IssuerCert.

However, if the determination back in step 240 is affirmative (i.e., a CRL has been found), the program proceeds to step 252. In step 252, a determination is made as to whether a field attribute value of the CRL indicates that Cert has been revoked or is on hold. If the determination is negative (i.e., Cert has neither been revoked nor on hold), the program proceeds to steps 244 and 246. In step 244, the value of the variable "UsableNotAfter" is set equal to the lesser value of the current value of "UsableNotAfter" and Cert's field attribute value of "Validity.notAfter". And then in step 246, the variable IssuerCert is now set to be equal to Cert to take the next certificate in the certification path (i.e., the next certificate in the stack is popped off the stack). The program returns back to step 208 to repeat the steps for this new IssuerCert.

However, if the determination in step 252 is affirmative (i.e., Cert has been revoked or is on hold), then the program proceeds to step 256. In step 256, the value of the variable "UsableNotAfter" is set equal to the CRL's field attribute value of "RevocationDate". And then in step 246, the variable IssuerCert is now set to be equal to Cert to take the next certificate in the certification path (i.e., the next certificate in the stack is popped off the stack). The program returns back to step 208 to repeat the steps for this new IssuerCert. From the program 200 described hereinabove, it should be apparent that (i) the certification path is being validated, and (ii) the value of the variable "UsableNotAfter" is being calculated. More specifically, the value of the variable "UsableNotAfter" is calculated to be the earliest date among (i) the current date, (ii) the "Valid To" dates from all certificates contained in the certification path, (iii) the revocation dates from the CRL, and (iv) the hold dates from the CRL. In this regard, it should be pointed out that the earliest date for the variable "UsableNotAfter" is established in steps 244 and 256 of the program 200. Step 244 is executed when the certificate has been revoked or on hold, and step 256 is executed when the certificate has neither been revoked nor on hold. Also, it should be pointed out that the value of the variable "UsableNotAfter" depends upon at least one CRL being located and processed (as in steps 238 and 240) to provide the earliest date among the dates identified above.

The earliest date calculated above represents the last date on which the certificate was valid. When the operator makes a request to validate the certificate and provides a date which is after the earliest date calculated above, a conclusion is made that the certificate is not valid. However, when the operator makes a request to validate the certificate and provides a date which is before the earliest date calculated above, a conclusion is made that the certificate was valid on the user-provided date. Since the user-provided date is before the last date on which the certificate was valid, it can be said that the certificate has been validated as of a date in the past (i.e., as of a historical date which is the user-provided date in this case).

It should also be apparent that the program 200 returns one or more of the following categories of information: (i) a value of "UsableNotAfter", (ii) a list of warnings, and (iii) an error indication. The program terminates in one of two different ways. If no error indication is generated, then the program 200 returns the value of "UsableNotAfter" and a list of warnings before terminating. However, if an error indication is generated, then the program 200 returns the error indication and a list of warnings before terminating.

It should also be apparent that warnings are configurable and are stored in a list in the order they occur, and there is no limit as to how many warnings can occur before the program 200 terminates. However, the program 200 terminates immediately when the first error indication occurs or the first warning that has been configured to terminate occurs. The error indication or the warning which has been programmed to terminate is associated with a particular certificate.

Although the above description describes a process in which validation results are provided immediately to the operator in response to the operator making a request to validate a digital certificate, it is conceivable that validation results could be stored and then updated later when more information becomes available (such as when new certificates or CRLs are imported, deleted, or updated). For example, validation results could be stored and then later re-validated as a scheduled task.

Although the above description describes a human operator making a request via the user interface 14 to validate a digital certificate, it is conceivable that the request or multiple requests could be received in an automated stream from an external source without any human intervention.

Also, although the above description describes the certification path building program 100 and the certification path validating program 200 as being two separate programs, it is conceivable that these two programs could comprise a single program. It is also conceivable that these two programs be separated into three or more different programs.

As described hereinabove, step 238 in program 200 involves making an attempt to locate a CRL in the second data store 24. In this regard, it should be pointed out that the CA can issue two different types of CRLs. One type of CRL is known as a "complete CRL", and the other type of CRL is known as a "delta CRL". It should also be pointed out that the CA can issue CRLs in one of two different ways, as is known.

In one way, the CA issues only "complete CRLs". In the other way, the CA issues both "complete CRLs" and "delta CRLs".

When the CA issues only "complete CRLs", the CA includes all revocation information it wishes to publish for its issue date in one CRL, as is known. However, when the CA issues both "complete CRLs" and "delta CRLs", the CA first issues a base "complete CRL" which contains base revocation information, and then subsequently issues a "delta CRL" which contains new revocation information to be merged with the base revocation information. The merging of the new revocation information with the base revocation information provides complete revocation information. New revocation information from other subsequently issued "delta CRLs" is merged with the base revocation information in the same manner to again provide complete revocation information.

FIG. 4 is a flowchart 300 which depicts operation of a CRL locating sub-program for finding a certificate revocation list (CRL) for use in the certification validation program 200 of FIG. 3. In step 312, an attempt is made to locate the oldest CRL issued after expiry date of the certificate. A determination is then made in step 314 as to whether the oldest CRL issued after expiry date of the certificate was found. If the determination in step 314 is affirmative (i.e., the CRL has been found), then this CRL is provided by the sub-program 300 for use in the certification path validating program 200 of FIG. 3. However, if the determination in step 314 is negative (i.e., no CRL has been found), the sub-program proceeds to step 316.

In step 316, an attempt is made to locate the most recent CRL issued before expiry date of the certificate but not before the certificate became valid. A determination is then made in step 318 as to whether the most recent CRL issued before expiry date of the certificate but not before the certificate became valid was found. If the determination in step 318 is negative (i.e., no CRL has been found), then no CRL is provided by the sub-program 300. However, if the determination in step 318 is affirmative (i.e., a CRL has been found), the sub-program proceeds to step 320.

In step 320, a determination is made as to whether the CRL found in step 316 has a CRL number which is indicative of the CRL possibly having delta CRLs. If the determination in step 320 is negative (i.e., the CRL does not have a CRL number and, therefore, does not have any delta CRLs), then the CRL is returned by the sub-program 300 for use in the certification path validating program 200 of FIG. 3. However, if the determination in step 320 is affirmative (i.e., the CRL found in step 316 is a base "complete CRL"), then the sub-program proceeds to step 324.

In step 324, an attempt is made to locate the most recently issued "delta CRL". "Delta CRLs" are known and therefore will not be described. A determination is then made in step 326 as to whether the most recently issued "delta CRL" has been found. If the determination in step 326 is negative (i.e., the most recently issued "delta CRL" has not been found), then the CRL found back in step 316 is returned by the sub-program 300 for use in the certification path validating program 200 of FIG. 3. However, if the determination in step 326 is affirmative (i.e., the most recently issued "delta CRL" has been found), then the sub-program proceeds to step 328. In step 328, the "delta CRL" found back in step 324 and the CRL found back in step 316 are combined in a known manner to provide an "adjusted CRL" which is returned by the sub-program 300 for use in the certification path validating program 200 of FIG. 3.

It should be apparent that the sub-program 300 is attempting to locate the first complete CRL issued after expiry date of the certificate. However, if no such CRL can be found, then the sub-program returns the most recently issued complete CRL since the certificate became valid.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of validating a digital certificate, the method, comprising:
   electronically by a processor retrieving from a computing system first data store a digital certificate;
   electronically by a processor retrieving from a second data store a plurality of, certificate revocation lists (CRLs);
   electronically by a processor selecting one of the plurality of CRLs to validate the digital certificate as of a date which is before the current date;
   based upon the selected CRL, electronically by a processor calculating the last, date on which the digital certificate was valid;
   electronically by a processor receiving a user-provided date from an operator; and
   electronically by a processor comparing the user-provided date with tile last date on which the digital certificate was valid to determine if the certificate was valid on the user-provided date.

2. A method according to claim 1, further comprising:
   based upon the comparison of the user-provided date with the last date on which the digital certificate was valid, electronically by a processor concluding that the certificate was valid on the user-provided date when the user-provided date is before the last date on which the digital certificate was valid.

3. A method according to claim 1, further comprising:
   electronically by a processor storing at least some validation results for updating at a later time.

4. A method of validating a digital certificate, the method comprising:
   electronically by a processor retrieving from a computing system first data store a digital certificate;
   electronically by a processor obtaining a first date value from the digital certificate;
   electronically by a processor obtaining a second date value from a certificate revocation list (CRL); and electronically by a processor using the earliest of the first and second date values to represent the last date on which the digital certificate was valid, and thereby to allow an operator to validate the digital certificate as of the last date on which the digital certificate was valid;
   electronically by a processor receiving a user-provided date from an operator; and
   electronically by a processor comparing the user-provided date with the last date on which the digital certificate was valid to determine if the certificate was valid on the user-provided date.

5. A method according to claim 4, further comprising:
   based upon the comparison of the user-provided date with the last date on which the digital certificate was valid, electronically by a processor concluding that the certificate was valid on the user-provided date when the user-provided date is before the last date on which the digital certificate was valid.

6. A method according to claim 4, wherein the first date value from the digital certificate represents an expiry date associated with the digital certificate.

7. A method according to claim 6, wherein the second date value from the CRL represents a revocation date associated with the digital certificate.

8. A method according to claim 6, wherein the second date value from the CRL represents a hold date associated with the digital certificate.

9. A method according to claim 4, further comprising:
   electronically by a processor storing at least some validation results for updating at a later time.

10. A digital certificate validation system comprising:
    a processor for (i) retrieving from a first data store a digital certificate, (ii) retrieving from a second data store a plurality of certificate revocation lists (CRLs), and (iii) selecting one of the plurality of CRLs to validate the digital certificate as of a date which is before the current date, wherein (a) the processor calculates the last date on which the digital certificate was valid based upon the selected CRL, (h) the processor receives a user-provided date from an operator, and (c) compares the user-provided date with the last date on which the digital certificate was valid to determine if the certificate was valid on the user-provided date.

11. A digital certificate validation system according to claim 10, wherein the processor concludes that the certificate was valid on the user-provided date when the user-provided date is before the last date on which the digital certificate was valid based upon the comparison of the user-provided date with the last date on which the digital certificate was valid.

* * * * *